United States Patent [19]

Henderson et al.

[11] Patent Number: 4,825,519

[45] Date of Patent: May 2, 1989

[54] MACHINE FOR MAKING AWNINGS

[75] Inventors: Robert M. Henderson, Renton; William Aspinall, Seattle, both of Wash.

[73] Assignee: Supreme Aluminum Products, Renton, Wash.

[21] Appl. No.: 54,620

[22] Filed: May 27, 1987

[51] Int. Cl.[4] .............................................. B23P 23/04

[52] U.S. Cl. .................................... 29/33 K; 29/21.1; 29/33.5; 29/56.6; 29/243.5; 160/235

[58] Field of Search ..................... 29/21.1, 33 K, 33.5, 29/56.5, 56.6, 243.5; 160/233, 234, 235, 236; 72/325

[56] References Cited

U.S. PATENT DOCUMENTS

| | | | |
|---|---|---|---|
| Re. 28,684 | 1/1976 | Kataoka | 29/822 |
| 1,141,046 | 5/1915 | Dubus | 29/21.1 X |
| 3,934,327 | 1/1976 | Hafner | 29/21.1 X |
| 4,208,776 | 6/1980 | Schleicher | 29/21.1 X |
| 4,394,794 | 7/1983 | Shirey | 29/21.1 X |
| 4,696,210 | 9/1987 | Cain et al. | 83/368 X |

*Primary Examiner*—Timothy V. Eley
*Assistant Examiner*—Frances Chin
*Attorney, Agent, or Firm*—Seed and Berry

[57] ABSTRACT

A machine for assembling awning slats having a front longitudinal side edge portion curled downwardly and rearwardly along the length of the slat, and having a rear longitudinal side edge portion curled upwardly and forwardly along the length of the slat in the complementing configuration, has a pair of aligned anvils for receiving two side-by-side slats which are interfitted by their front and rear curled side edge portions. Punching units form locking tabs and registering cutouts in the interfitting side edge portions of the slats on the anvils and then the slats are advanced laterally a slat width by slat shifting units to receive another interfitting slat fed longitudinally onto the anvils. Slat hold-down units cooperate with the anvils during the slat punching and feeding operations.

30 Claims, 6 Drawing Sheets

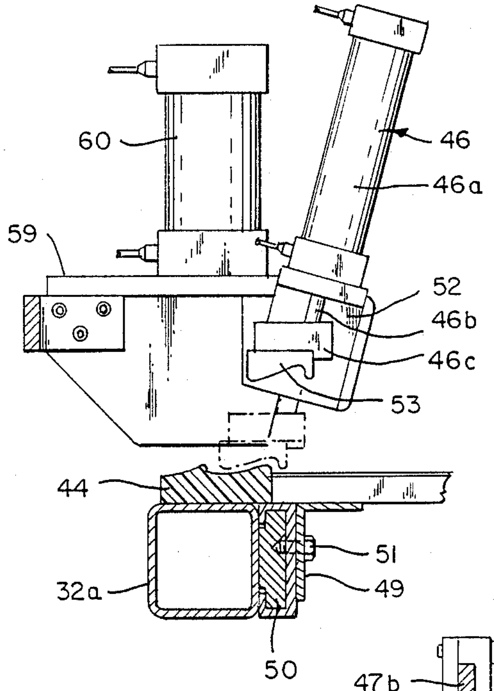
FIG. 6
FIG. 7
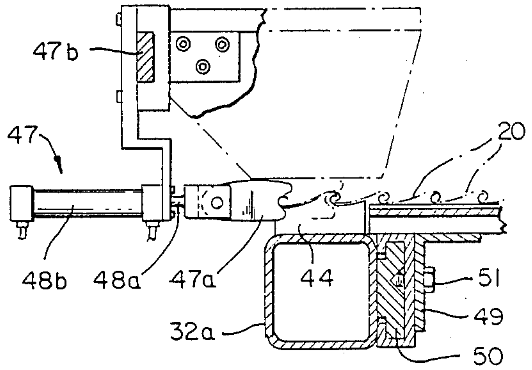
FIG. 8
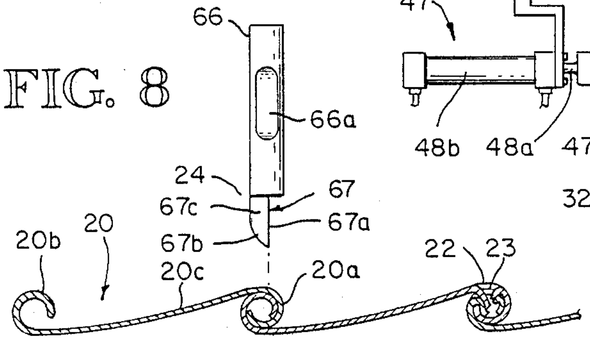
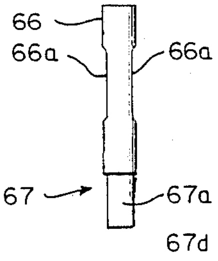
FIG. 9
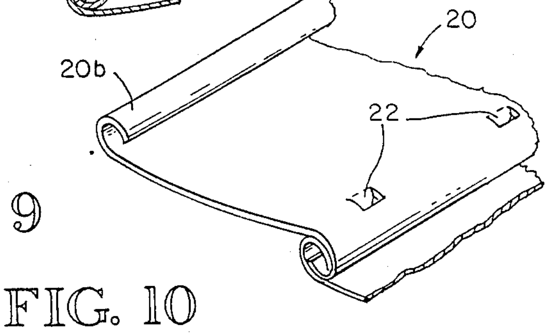
FIG. 10

FIG. 11
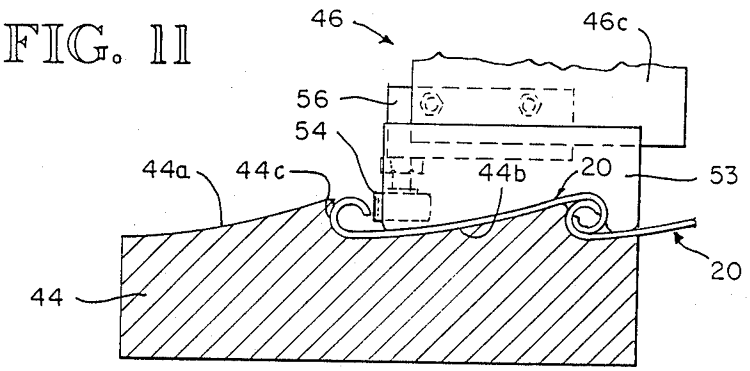
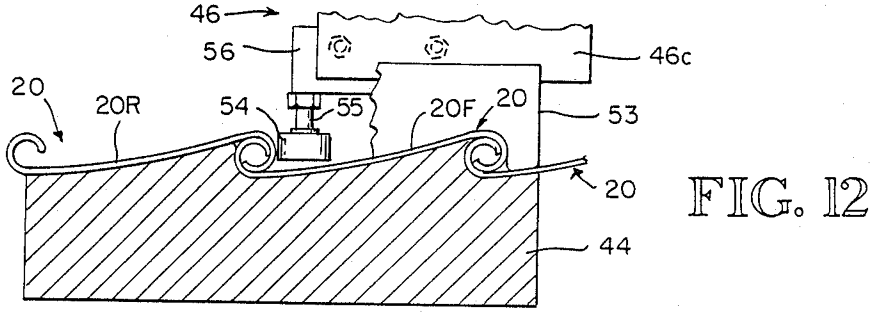
FIG. 12
FIG. 13
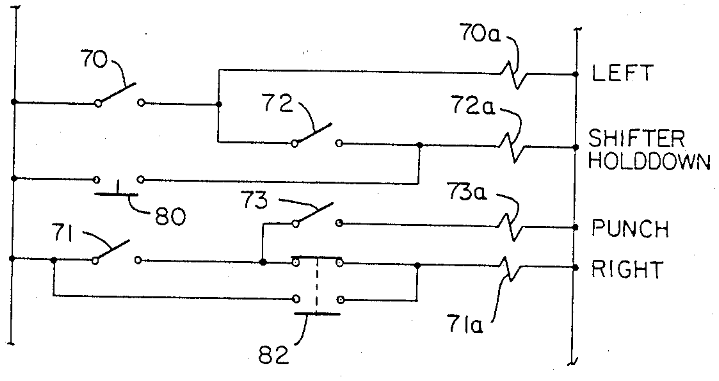

MACHINE FOR MAKING AWNINGS

DESCRIPTION

1. Technical Field

This invention relates to a machine and method for making awnings from a plurality of slats, each having a downcurled portion along one longitudinal side edge and a complementing upcurled portion along the opposite longitudinal side edge. The described slats can be longitudinally interfitted in planar side-by-side relation to make an awning which can be rolled up for storage since the interfitting longitudinal side edge portions of the slats can move angularly in relation to one another.

2. Background Art

Typically, such awnings were made by hand. workman would place one slat on a table or other work surface, align the downcurled side edge of a second slat with the upcurled side edge of the first slat, and then slidably interfit the foregoing edges. A hand-crimp or punch was then used to punch one or two tabs and holes adjacent each end of the two interfitting slats to prevent lengthwise disengagement of the slats. The punch typically utilized was pointed such that a roughly pointed locking tab was formed in the downcurled side edge portion of the second slat which would engage in a corresponding roughly circular opening or recess formed in the under lying upcurled side edge portion of the first slat during the punching operation. The function of the locking tabs was to prevent relative longitudinal movement between the slats.

The foregoing interfitting and punching procedure would be repeated, with the downcurled side edge portion of an additional slat being engaged with the still free upcurled side edge portion of the second slat, and additional repetitions made as required to produce an awning of the desired width measured transversely of the slats.

The foregoing process is unduly time-consuming, thereby resulting in high labor costs. Furthermore, the pointed tabs and recesses often became disengaged due to wind vibration and repeated rolling up of the awning. Increasing the length of the pointed tabs does not offer a solution to this problem because it would restrict adequate angular sideways movement of the engaged slats with respect to one another, and would thereby prevent the awning from being able to be readily rolled up when not in use.

U.S. Pat. No. 3,651,555, to Kataoka discloses a machine for assembling awnings from slats with interengaging downcurled and upcurled side edges. Before the slats are assembled, two transverse slots are precut adjacent each end of the upcurled longitudinal edge portion of each slat, starting at the extreme edge, to isolate two downcurled tabs, and these are complemented by two precut cutouts in the downcurled longitudinal side edge portion of each slat. In the Kataoka machine, after the slats are longitudinally interfitted and then moved laterally, a pair of plungers push the precut tabs into the registering precut cut cutouts to prevent the slats from moving substantially lengthwise with respect to one another.

The Kataoka approach for locking the slats against relative endwise movement requires that the dimension of the awning endwise of the slats be set prior to the forming of the precut tabs and cutouts since normally the tabs and cutouts would be made while the slats were in flat strip form coming off a roll of strip material, and then the tabs would be preliminarily upcurled at the same time as the upcurling of the remainder of the longitudinal side edge portion from which the tabs were formed. Furthermore, the Kataoka approach requires a tab-bending step after the slats are longitudinaly interfitted, as well as the initial tab-forming step.

It is advantageous, then, not only to have an apparatus and a method for producing awnings of the type described which can replace the time-consuming steps of hand-assembly, but which will provide suitable tab and slot means for preventing relative longitudinal endwise movement of the slats by a simplified procedure which does not require precutting of the tabs and slots before assembly of the slats.

DISCLOSURE OF THE INVENTION

By the present invention, locking of the described slats against relative endwise movement is accomplished by way of pairs of rectangular tabs, each cut on three sides, which are formed in the downcurled side edge portion of each slat after slat assembly by a punching action and bent downwardly into cutouts formed by the same punching action in the underlying upcurved portion of the adjoining slat.

While the punching is being performed by a pair of punching units, the slat having the cutouts is held seated by a pair of hold-down units on an anvil face matching the shape of the underside of two side-by side slats. These hold-down units are coordinated with a pair of slat-shifting units which shift the slats laterally after the slat-punching operation is performed. Then an infeed device feeds another slat endwise into interfitting relation with the last slat on which the punching units operated. When the feed unit has advance sufficiently to feed a slat onto the anvil face, it causes the punching units to operate; and while the feed unit retracts, it causes the shifting units to advance and the hold-down units to retract so that all of the assembled slats will be caused to be moved laterally a single slat width toward an outfeed storage rack. Further retraction of the feed unit units to advance and engage the last slat, such as to accurately seat the latter on the anvil face.

The hold-down units have resilient hold-down pads and carry horizontal guide rollers which overlie the last slat and are spaced a short distance from the downcurled edge of the last slat so as to be engaged by the downcurled edge portion of the next slat being fed onto the anvil face and thereby properly position the slat while being fed preparatory to the next punching operation. The punching, hold-down, shifting and feeding units are compressed-air operated and are controlled by solenoids in a control circuit including manual switches for controlling the feed unit and solenoid control switches engaged by the feed unit during its operation.

The distance between the pairs of punching units, shifting units, anvils and hold-down units can be adjusted for various slat lengths. The outfeed storage rack has three aligned reach arms. One of the two outer reach arms adjusts in spacing relative to the other outer reach arm by way of adjustment of one of the punching units, and the center reach arm has an independent adjustment.

The punching units each operate a pair of wedge-shaped punches which extend partway through a resilient slat-engaging pad which compresses before and after the punches engage the downcurled edge portion of the last slat. By this arrangement, the slat-engaging pads apply pressure on the last slat until the punches release from the slat, thereby preventing slat deformation while the punches are retracting. The slat-engaging portions of the hold-down units are also preferably resilient pads of rubber or the like so as not to deform the slats.

BRIEF DESCRIPTION OF THE DRAWINGS

In the drawings:

FIGS. 6 and 7 are transverse sectional views taken along lines 6—6 and 7—7 in FIG. 2;

FIG. 8 shows one of the punching tools in side elevation and in punching alignment with interfitted slats shown in transverse cross section;

FIG. 9 is a front elevational view of one of the punching tools;

FIG. 10 is a perspective fragmentary view of two interfitting slats illustrating a locking tab formed in accordance with the present invention;

FIGS. 11 and 12 are detail transverse sectional views taken as indicated by line 11—11 in FIG. 2, and illustrating the work station ready to receive an additional slat (FIG. 11) and after the slat has been delivered (FIG. 12);

FIG. 13 is a schematic of a suitable electrical control system for operating the machine.

BEST MODE FOR CARRYING OUT THE INVENTION

Figure 1:
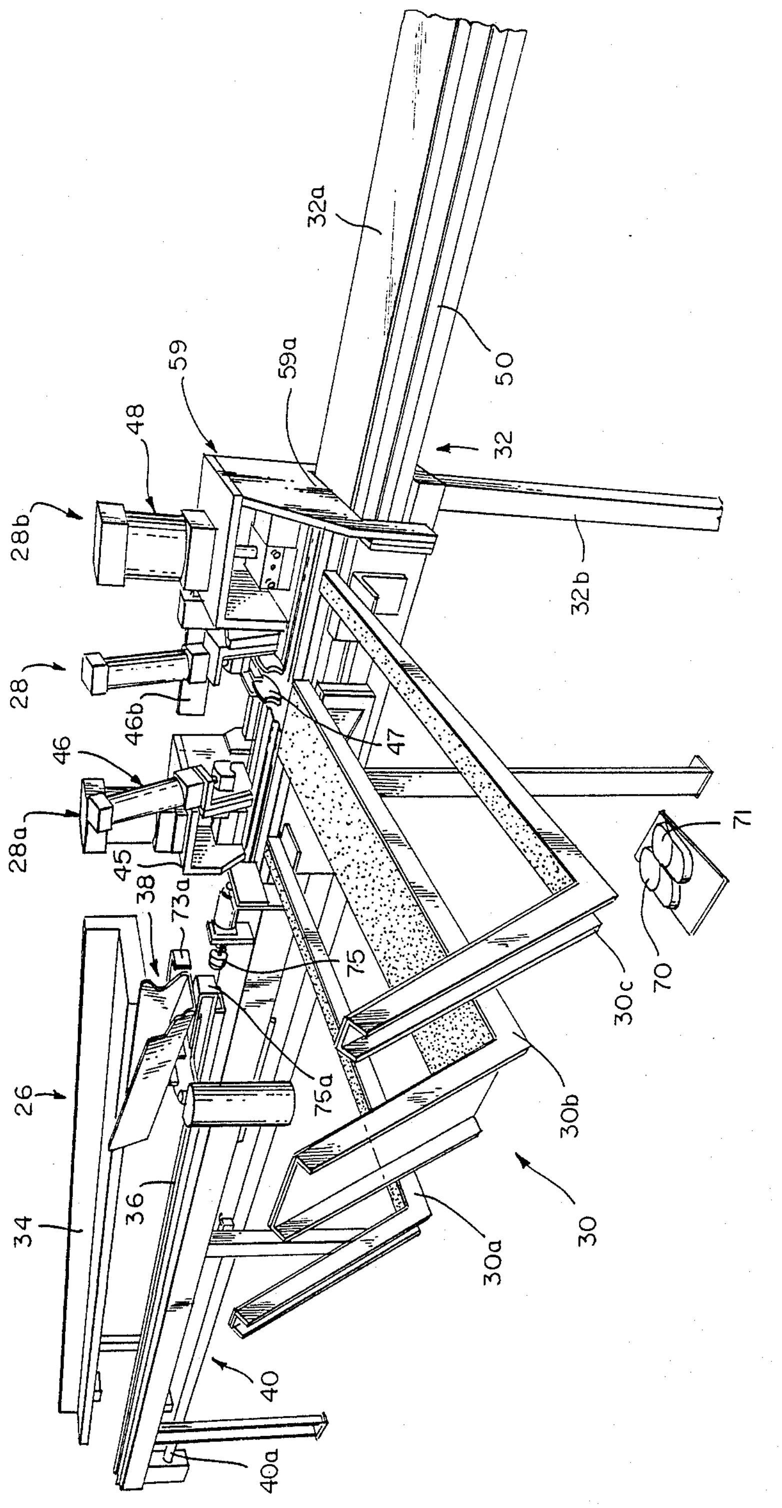
FIG. 1 is a front perspective view of a machine embodying the present invention.
Figure 2:
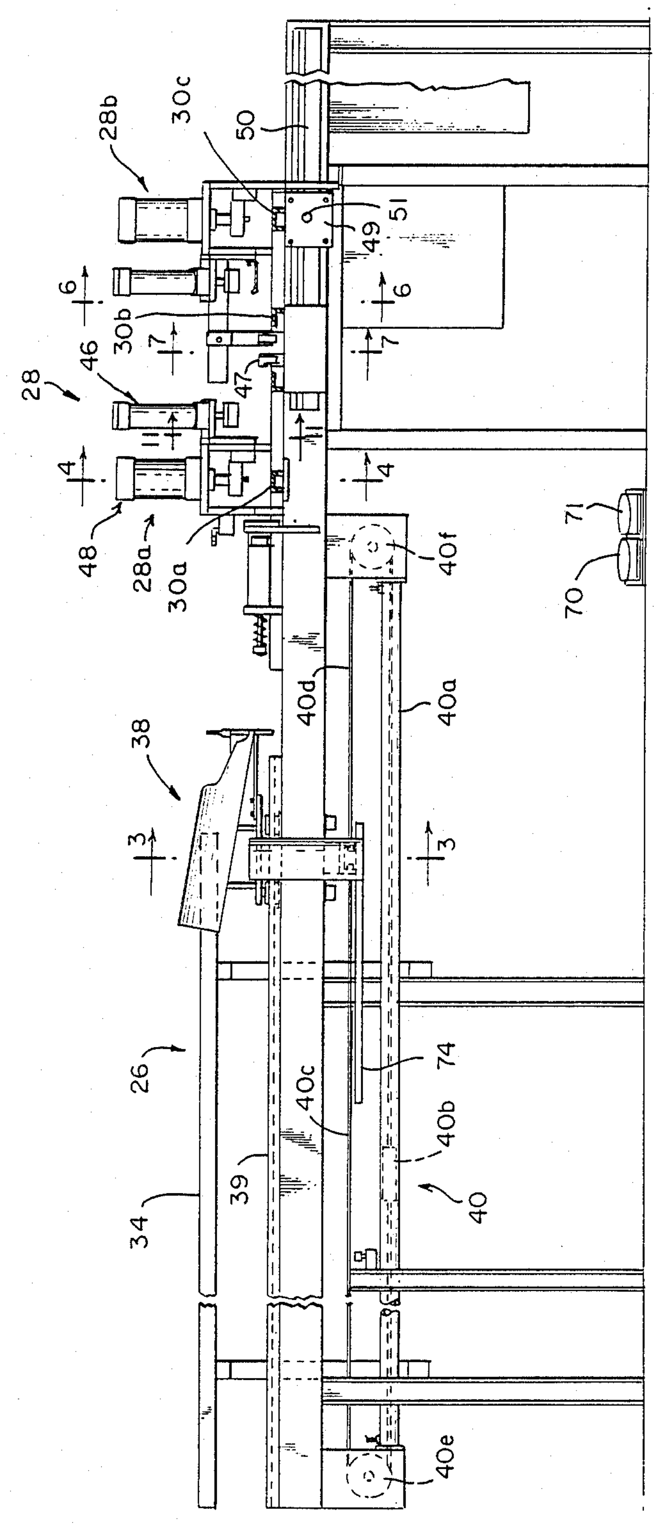
FIG. 2 is a front elevational view of the machine.
Figure 3:
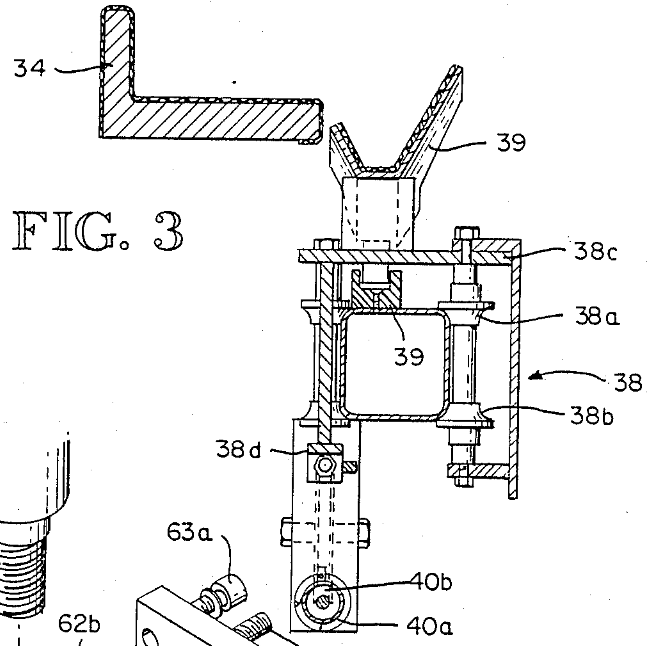
FIGS. 3 and 4 are transverse sectional views taken as indicated by lines 3—3 and 4—4 in FIG. 2.

Directing attention to FIG. 8, preparatory to being assembled together by the present invention, individual elongated slats 20 are roll-formed so that each slat, as viewed from an end, has a front downcurled portion **20*a* and a rear upcurled rolled portion 20*b* at opposite longitudinal sides of a central section 20*c* which slopes upwardly from the center line of the slat to the front downcurled portion and slopes downwardly a like amount from the center line to the rear upcurled portion. Thus the slat configuration is one in which the rear upcurled portion 20*b* of a forwardly positioned slat can interfit with the front downcurled portion 20*a* of a rearwardly positioned adjoining slat. This interfit is accomplished in accordance with the present invention by aligning the front downcurled portion 20*a* of the rearwardly positioned slat with the rear upcurled portion 20*b*** of the forwardly positioned slat, and then sliding the rearwardly positioned slat endwise toward the forwardly positioned slat from an infeed position while holding the latter stationary.

Then, in accordance with the present invention, a pair of rectangular positioning tabs 22 are punched downwardly adjacent each end of the slats in the uppermost front portion of the rearwardly positioned slat by action of punches 24 which, during their punching stroke, continue downwardly through the underlying upper portion of the rear upcurled portion of the forwardly positioned slat to form cutouts 23 into which the tabs 22 project. It will be appreciated that if the two interlocked slats are then shifted together forwardly the width of a slat, the infeeding and punching procedure can be repeated for interfitting and interlocking another slat. When the procedure has been repeated several times, the resulting set of slats can be rolled for storage relative to the frontmost slat in a clockwise direction as viewed from the left end. Then, when the set of slats is unrolled, the tabs 22, by way of their interfit with the cutouts 23, prevent the slats from shifting endwise relative to one another.

In carrying out the present invention, there is provided an infeed section 26, an assembly section 28, and an outfeed section 30 supported by a frame 32 having a long beam **32*a* supported by legs 32*b*. The infeed section 26 has an elevated storage rack 34 mounted at the back of the frame 32, a guide channel 36 on top of the beam 32*a*, and a feed carriage 38 riding along the beam 32*a* by way of pairs of top and bottom rollers 38*a*, 38*b*. The feed carriage 38 has an upper guide trough 39 alongside the storage rack 34 and is selectively moved endwise along the beam 32*a* by action of a carriage moving mechanism 40 including an elongated pneumatic cylinder 40*a* mounted beneath the beam 32*a*. This cylinder 40*a* has a floating double-acting piston 40*b* connected to cable sections 40*c*, 40*d* which pass through stuffing boxes at the closed ends of the cylinder and around pulleys 40*e*, 40*f*, whereupon they connect to a bracket 38*d* at the underside of the frame 38*c* of the carriage 38. With this arrangement, movement of the piston 40*b* in one endwise direction results in movement of the feed carriage 38** in the opposite direction.

The assembly section 28 has a stationary work station **28*a* adjoining the infeed section 26 and an adjustable work station 28*b* spaced from the infeed section 26. Directing attention to FIGS. 11-12, the work stations each have an anvil section 44 which has a rear longitudinal section with an upper concave anvil face 44*a* aligned with the guide channel 36, and has a front section with a concave upper anvil face 44*b*. The forward portion of the rear anvil face 44*a* merges with the rear portion of the front anvil face at a central ridge 44*c*. It will be noted that the contour of the faces 44*a*, 44*b* is patterned generally from the underside of the central section 20*c* of the slats 20 and the starting portion of the upcurved rear portion 20*b* of the slats. As a result, each anvil section 44 is shaped to have a front slat 20F seated on the front anvil face 44*a* with the rear upcurled portion 20*b* of the slat seated against the central ridge 44*c*, and to have a rear adjoining slat 20R seated on the rear anvil face 44*b* with the front upcurled portion 20*d* of the rear slat overlying and interfitting with the rear downcurled portion 20*a* of the front slat. The anvil section 44 is mounted on the frame of the adjustable work station 28*b* and is therefore movable therewith. The anvil section has a stop at its outer end may comprise the outer end plate 59*a* of the frame for the work station. It is preferred to have the guide channel 36 of the infeed section 26 formed with an upper face mating with that of the rear anvil face 44*b* so that a slat being pushed along the channel 36 will be perfectly guided into the assembly section 28 to register by its front downcurled portion 20*a* with the rear upcurled portion 20*b* of a slat seated on the front anvil face 44*a***.

Except for the adjustability of the work station **28*b*, the two work stations 28*a*, 28*b* can be right- and left-hand counterparts; therefore, like parts thereof will be given the same reference numerals. The stationary work station has a support frame 45 straddling the beam 32*a* and includes a slat hold-down unit 46**, a slat-shifting unit 47, and a slat-punching unit 48. The adjustable work station 28*b* is slidable along the beam 32*a* and, for this purpose, has a depending front guide 49 presenting a rearwardly directed channel with inturned lips slidably interfitting with a front guide rail 50 of T-section mounted on the beam. A clamping screw 51 extends through the guide 49 into engagement with the rail 50 for locking the work station 28*b* in a selected position defined by the length of the slats 20 being processed. If desired, the guide rail can be extended to the position of the work station 28*a* and the latter mounted in the same manner as work station 28*b*.

As shown in FIG. 7, each slat-shifting unit 47 has a pusher head 47*a* adapted to slide between the anvil sections 44 to engage the back edge of a slat 20 seated on the rear guide face 44*b* of the anvil sections and push the slat forwardly onto the front anvil face 44*a*. Each pusher head 47*a* is mounted on the piston rod 48*b* of a doubleacting piston operating in a pneumatic cylinder 48*b*. The front pusher end of head 48*a* is preferably centrally recessed where it engages the back longitudinal side edge portion of the back slat. The slat-shifting unit 47 for the adjustable work station is mounted by an arm 476 on the frame thereof, and the other unit 47 may be mounted on the back of the beam 32*a*.

Directing attention to FIG. 6, each slat hold-down unit 46 is mounted on a side bracket 52 such that its pneumatic cylinder 46*a* slopes downwardly to the rear. A double-acting piston in the cylinder 46*a* has its rod 46*b* connected to a mounting block 46*c*, which in turn carries a resilient hold-down foot 53 of a rubber-like material. This foot 53 may have its lower face preformed to the contour of the upper face of the slats or may be made of a soft enough resilient material, such as sponge rubber, to readily deform to the slat shape upon pressure contact with a slat. The slope of the cylinder 46*a* causes the hold-down foot 53 to crowd the slat which rests on the front anvil face rearwardly against the central ridge 44*c* responsive to engagement of the foot.

As shown in FIGS. 11–12, it is preferred to provide a guide roller 54 on each hold-down unit 46 in a location whereat the guide roller is positioned directly in front of the upcurled rear edge of a front slat 20F seated on the front anvil seat 44*b*, and is spaced from this upcurled rear edge by a gap slightly wider than the thickness of the slat material. Each guide roller 54 is journaled on a stub shaft 55 depending from a vertically adjustable connection with an angle bracket 56 which is screw-mounted on an end of the respective mounting block 46*c*, preferably such as to permit adjustment of the distance between the roller and the central anvil ridge 40*c*.

Figure 5:
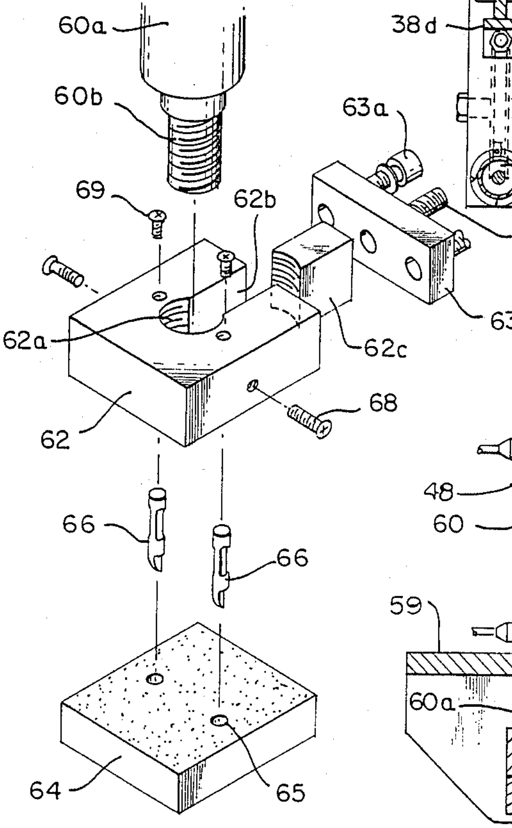
FIG. 5 is an exploded perspective view of part of the slat-punching unit.
Figure 4:
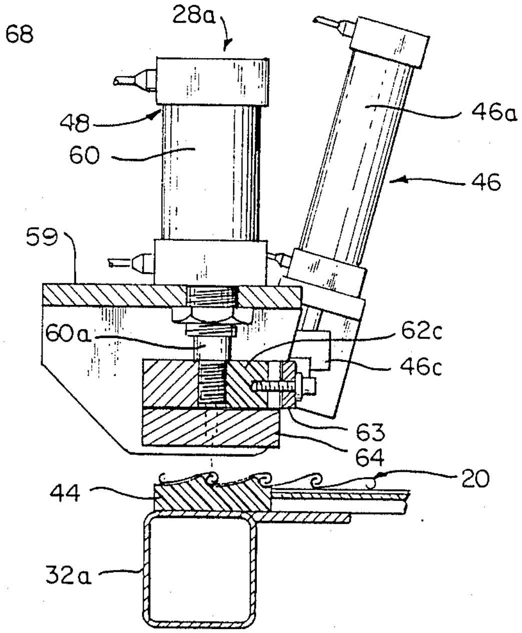

Referring to FIGS. 4–5, each slat-punching unit 48 has a mounting plate 59 on which a pneumatic cylinder unit 60 is vertically mounted with its piston rod 60*a* extending downwardly and threaded at 60*b* to make a vertically adjustable connection with a holding block 62 having a resilient rubber compression pad 64 mounted on its underside. The holding block 62 has a central threaded bore 62*a* to receive the lower threaded end of the piston rod 60*a*. The bore is interrupted by a slot 62*b* receiving a locking block 62*c* which is concave and threaded at its inner end in accordance with the diameter and threading of the bore 62*a*. The locking block 62*c* is held in place by an end plate 63 secured to the block 62 by screws 63*a*. A setscrew 62*d* passing through the end plate 63 engages the locking block 62*c* to hold the height setting of the holding block 62 on the piston rod 60*a*.

The compression plate 64 is intersected by a pair of bores 65 through which a pair of punching pins 66 extend from the holding block 62. As shown in FIG. 8, these pins 66 have a generally wedge-shaped punching head 67 with a flat vertical forward face 67*a* a curved back face 67*b*, flat vertical end faces 67*c*, and a bottom cutting edge 67*d*. Each punching pin 66 is formed with a pair of diametrically opposite flats 66*a* for engagement by setscrews 68 threaded into the block 62. The cutting edge 67*d* of each pin 66 is set by vertical screws 69 at a height such that when the piston rod 60*a* is at the bottom of its stroke, the respective pair of punching heads 67 have passed the desired amount through the underlying interfitted curled ends of the two slats resting on the anvil 44.

The thickness of the resilient pad 64 is such that the punching heads 67 do not reach the lower end of the bores 65 unless the pad 64 is in a compressed state. Hence, during the downward stroke of the piston rod 60*a*, the pad 64 engages the slats on the underlying anvil section 44 and is compressed before the punching heads reach the downcurled front edge portion of the rear slat 20R. Hence the pad 64 then not only holds the rear slat down against the anvil, but also holds it down until the punching heads are retracted clear of the slats.

The outfeed section 30 comprises three forwardly projecting slat support arms 30*a*, 30*b* and 30*c*. The first and third of these arms are mounted on the frames, of the stationary and adjustable work stations 25*a* and 28*b*, respectively, and the other arm 30*b* is adjustably mounted on the beam 32*a* by a slide bracket 70 engaging the rail 50 in the same manner as the adjustable work station 28*b*. Each arm of the outfeed section 30 extends horizontally forwardly from the anvil sections 44 and then slopes upwardly for space economy to support the interfitted slats being discharged from the anvil sections by action of the slat-shifting units 48.

Operation of the described equipment involves use of two normally open foot switches 70, 71 and two microswitches 72, 73. The foot switches 70, 71 are located adjacent the stationary work station 42 and control the operation of the infeed section 26. The switch 72 controls operation of the hold-down units 46 and slat-shifting units 48, and the switch 73 controls operation of the slat-punching units 50. The switch 72 is mounted on the frame 32 a few feet to the left of the assembly section 28 and has an operating swing arm 72*a* having a normal "off" position projecting forwardly, an "on" position projecting away from the work stations, and a "pass/-off" position projecting toward the work stations. A switch-operating bar 74 is carried by the feed carriage 38 and is arranged (a) to engage and swing the arm 72*a* from its "off" position to its "pass/off" position while the carriage 38 moves in a slat-feeding direction toward the work stations; (b) to release the arm 72*a* so that the arm is free to swing forwardly by a spring to its "off" position while the carriage 38 continues toward the work stations; and (c) to engage the arm 72*a* so that the arm swings to its "on" position while the carriage 38 moves in a return direction away from the assembly station and holds the arm 72*a* in its "on" position sufficiently for operation of the slat-shifting units 47.

Microswitch 73 is mounted at the stationary work station 28*a* and has an operating swing arm arranged to be swung from a normally closed "off" position to an "on" position. As the carriage 38 reaches the stationary work station 28*a* during its slat-feeding travel, it is slowed by a spring-loaded bumper 75 opposed by a stop element 74*a* on the carriage, and then an ear 73*a* on the carriage engages the swing arm of the microswitch 73 and moves the swing arm to the "on" position of switch 73. This causes the punching units 50 to operate.

The two foot switches 70, 71 are electrically connected to solenoids 70*a*, 71*a* at the opposite ends of a pneumatic control valve 76. This valve 46 shuttles when solenoid 70*a* is activated by the closing of foot switch 70 to connect a compressed air supply to the remote end of cylinder 40*a* and to vent the closer end thereof so that the piston 40*b* moves toward the assembly section 28, thereby returning the feed carriage 38 away from the work stations preparatory to starting a slat-feeding cycle. Closing of foot switch 71 activates solenoid 71*a* and shuttles the control valve 76 so as to connect the compressed air supply to the closer end of the cylinder 40*a* and vent the remote end thereof so that the piston 40*b* moves away from the work stations, thereby advancing the feed carriage 38 in an infeed direction toward the assembly section.

Figure 14:
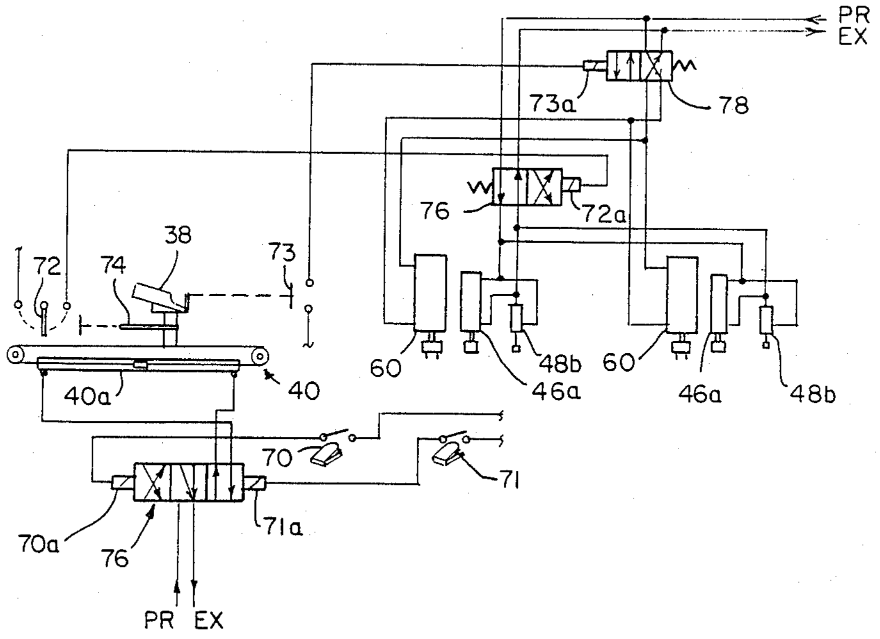
FIG. 14 is a schematic showing a suitable pneumatic control system for the machine.

As indicated in FIG. 14, the pneumatic circuits for the cylinders 48*b* of the slat-shifting units 47 and the cylinders 46*a* for the slat hold-down units 46 are cross-connected connected so that when the pistons in the slat-shifting cylinders move forwardly, the pistons in the slat hold-down cylinders 46*a* move upwardly and vice versa. The microswitch 72 is electrically connected to a solenoid 72*a* at one end of a spring-loaded pneumatic control valve 76 which is normally spring-urged into a position venting the rear end of cylinders 48*b* of the slat-shifting units 48 and the lower end of the hold-down cylinders 46*a*, and charging the forward end of cylinders 48*b* and the upper ends of cylinders 46*a*. When the switch 72 is closed by the bar 74, thereby activating the solenoid 72*a*, the solenoid 72*a* operates in opposition to spring pressure to shuttle the valve 76 into a position venting the forward end of shift cylinders 48*b* and the upper end of hold-down cylinders 46*a*, and charging the rear end of shift cylinders 48*b* and the lower end of hold-down cylinders 46*a*. This results in activation of the slat-shifting units and retraction of the hold-down units until the bar 74 clears the switch 72. Referring to FIG. 13, it will be noted that closing of switch 72 does not close a circuit unless foot switch 70 is depressed. A manual override switch 80 may be provided to operate solenoid 72*a* independently.

The microswitch 73 is automatically closed when a slat has been delivered to the work stations by the operation of the feed carriage 38 in response to closing of the foot switch 71, and responsively activates a solenoid 73*a* which operates a spring-loaded pneumatic control valve 78. This valve 78 controls the air supply and venting of slat-punching cylinders 60. Normally the valve 78 is spring-loaded into a position where the pistons within the cylinders 60 are in an inactive raised position by way of venting of the upper end of the cylinders and pressurizing of the lower ends thereof via the valve 78.

Referring to FIG. 13, it will be noted that the punching units 48 cannot be operated unless the foot switch 71 is closed. This prevents operation of the punching units 48 by accidental closing of switch 73. However, it is desired to be able to operate the feed carriage 38 to feed the first slat for an awning into the assembly section without operating the punching units. For this purpose, a manual by-pass switch 82 may be provided which makes it possible to activate the solenoids 71*a* without closing of the switch 73 resulting in energizing solenoid 73*a* of valve 78.

Reviewing the operation of the machine, a slat is placed into the feed channel 39 while the carriage 38 is in a retracted position to the left, as viewed in the drawings. Then the switch 82 is pressed, causing the carriage to advance to the right and push the slat into the assembly section 28 and onto the rear seat of the anvil sections 44. This s accomplished without activating the punch units 48, since closing of the punch-activating switch 73 by the carriage does not result in closing a circuit to the punch cylinder control solenoid 73*a* unless the right foot switch 71 is depressed. The switch 82 is then released, and the left foot switch 70 is depressed to cause the carriage to retract to the left. While the carriage is retracting, the delay bar 74 closes the shifter/hold-down control switch 72. This results in upward retraction of the hold-down units and forward advancing of the shifting heads 47*a* into engagement with the rear edge of the slat. As the shifting heads further advance, they push the slat lateraly onto the front set of the anvil sections 44. Then, when the delay bar 74 clears the switch 72, the shifting heads retract and the hold-down pads 53 move downwardly into clamping engagement with the underlying front slat.

In the alternative, the operator can manually push the first slat into the working stations and close the switch 80 to advance the shifter heads and retract the hold-down pads so as to shift the first slat onto the forward seat of the anvil sections 44.

It will be noted that the described arrangement has the safety advantage of making it impossible to activate the slat-punching units without depressing the left foot switch 70 and keeping it closed until the carriage advances to its right-hand limit of travel, whereat it engages and closes the punch control switch 73.

With the first slat seated on the front half of the anvil sections as described, a second slat is placed in the feed channel and the left foot switch 70 depressed to cause the carriage to advance and load the second slat into the working stations on the rear half of the anvil sections 44. The carriage then closes switch 73, causing the punching units to operate and form two pairs of locking tabs 22 adjacent the ends of the two slats seated on the anvil sections. The described operation is continued until the desired awning length is achieved. To release the final slat, the switch 80 is closed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A machine for assembling slats of the type having a front longitudinal side edge portion curled downwardly and rearwardly along he length of the slat, and having a rear longitudinal side edge portion curled upwardly and forwardly along the length of the slat in a complementing configuration whereby the rear curled side edge portion of a front such slat can slidably receive therealong said front side edge portion of an adjoining back such slat in interfitting relation permitting sideways angular movement of the slats in relation to one another, said machine comprising:

longitudinally spaced and aligned anvil sections for supporting front and back such slats thereon in interfitting side-by-side relations, each of said anvil sections having a front anvil seat shaped to receive a front slat and having a rear anvil seat shaped to receive a rear slat interfitting with the front slat; and two punching units each having a downwardly acting punching means overlying respective of the anvil sections at longitudinally spaced locations for forming downwardly sloped locking tabs in the front interfitting side edge portion of the back slat while said slats are seated on the anvil sections and for also punching registering underlying cutouts in the rear interfitting side edge portion of the front slat such that the locking tabs extend into said cutouts to prevent relative endwise movement between said slats while permitting relative sideways angular movement therebetween.

2. A machine according to claim 1 in which said punching units are mounted on a beam, and one of said punching units and a respective one of said anvil sections are adjustable along the beam relative to the other punching unit to accommodate a variety of slat lengths.

3. A machine according to claim 1 in which two slat-shifting units are positioned adjacent said punching units for selectively engaging the rear edge of a back slat seated on the anvil sections and forwardly moving such slat and all interfitting slats located forwardly thereof a distance corresponding to a slat width after operation of the punching units.

4. A machine according to claim 1 in which a feed unit is slidably mounted in alignment with said anvil sections for selectively feeding a slat onto said anvil sections.

5. A machine according to claim 4 in which said shifting units are activated responsive to movement of the feed unit away from the punching units.

6. A machine according to claim 1 in which hold-down units are provided adjacent said punching units for selective movement toward front anvil seats to hold a front slat on the front anvil seats while a rear slat is being moved longitudinally along the rear anvil seats into interfitting position with a front slat seated on the front anvil seats, and also while the punching units are operating.

7. A machine according to claim 1 in which said machine includes:

hold-down units adjacent said punching units for selective advancement from a retracted position toward the front anvil seats into a hold-down position whereat the hold-down units hold a front slat on the front anvil seats while a back slat is being moved longitudinally along the rear anvil seats, into interfitting position with a front slat seated on the front anvil seats, and then while the punching units are operating; and two slat-shifting units positioned adjacent said punching units for selectively advancing forwardly into engagement with the rear edge of a back slat seated on said rear anvil seats after operation of the punching units and for forwardly moving such slat and all interfitting and interlocked slats located forwardly thereof a distance corresponding to a slat width.

8. A machine according to claim 7 in which said hold-down units and slat-shifting units are operatively interconnected such that the hold-down units retract when the slat-shifting units advance and vice versa.

9. A machine for assembling slats of the type having a front longitudinal side edge portion curled downwardly and rearwardly along the length of the slat, and having a rear longitudinal side edge portion curled upwardly and forwardly along the length of the slat in a complementing configuration whereby the rear curled side edge portion of a front such slat can slidably received therealong said front side edge portion of an adjoining back such slat in interfitting relation permitting sideways angular movement of the slats in relation to one another, said machine comprising:

longitudinally spaced and aligned anvil sections for supporting front and back such slats thereon in interfitting side-by-side relations;

two punching units each having a downwardly acting punching means overlying respective of the anvil sections at longitudinally spaced locations for forming downwardly sloped locking tabs in the front interfitting side edge portion of the back slat while said slats are seated on the anvil sections and for also punching registering underlying cutouts in the rear interfitting side edge portion of the front slat such that the locking tabs extend into said cutouts to prevent relative endwise movement between said slats while permitting relative sideways angular movement therebetween; and a feed unit slidably mounted in alignment with said anvil sections for selectively feeding a slat onto said anvil sections.

10. A machine according to claim 9 in which operation of said punching units is activated by the feed unit responsive to delivery of a slat to said anvil sections by the feed unit.

11. A machine according to claim 9 in which the beam has mounted thereon a slat guide section leading to the anvil sections, and said feed unit comprises a carriage straddling said slat guide section and riding along the beam.

12. A machine according to claim 9 in which a control circuit is provided for said punching units and includes a normally open switch located to be engaged and closed by said feed unit when delivery of a back slat to the anvil sections is accomplished by the feed unit.

13. A machine for assembling slats of the type having a front longitudinal side edge portion curled downwardly and rearwardly along the length of the slat, and having a rear longitudinal side edge portion curled upwardly and forwardly along the length of the slat in a complementing configuration whereby the rear curled side edge portion of a front such slat can slidably receive therealong said front side edge portion of an adjoining back such slat in interfitting relation permitting sideways angular movement of the slats in relation to one another, said machine comprising:

longitudinally spaced and aligned anvil sections for supporting front and back such slats thereon in interfitting side-by-side relations; and two punching units each having a downwardly acting punching means overlying respective of the anvil sections at longitudinally spaced locations for forming downwardly sloped locking tabs in the front interfitting side edge portion of the back slat while said slats are seated on the anvil sections and for also punching registering underlying cutouts in the rear interfitting side edge portion of the front slat such that the locking tabs extend into said cutouts to prevent relative endwise movement between said slats while permitting relative sideways angular movement therebetween, said punching units having respective resilient pads surrounding the punching means and arranged to move therewith and compress by engagement with said slats while said punching means move downwardly and before the punching means engage the front slat, whereby the resilient pads do not disengage from slat contact until after the punching means retracts from the slats.

14. A machine for assembling slats of the type having a front longitudinal side edge portion curled downwardly and rearwardly along the length of the slat, and having a rear longitudinal side edge portion curled upwardly and forwardly along the length of the slat in a complementing configuration whereby the rear curled side edged portion of a front such slat can slidably receive therealong said front side edge portion of an adjoining back such slat in interfitting relation permitting sideways angular movement of the slats in relation to one another, said machine comprising:

longitudinally spaced and aligned anvil sections for supporting front and back such slats thereon in interfitting side-by-side relations;

two punching units each having a downwardly acting punching means overlying respectively of the anvil sections at longitudinal spaced locations for forming downwardly sloped locking tabs in the front interfitting side edge portion of the back slat while said slats are seated on the anvil sections and for also punching registering underlying cutouts in the rear interfitting side edge portion of the front slat such that the locking tabs extend into said cutouts to prevent relative endwise movement between said slats while permitting relative sideways angular movement therebetween; and hold-down units mounted adjacent said punching units for selective movement form a retracted position into a hold-down position engaging the front slat to hold the front and back slats on the anvil sections during the operation of the punching units.

15. A machine according to claim 14 in which said hold-down units have resilient hold-down pads which compress upon engagement with the front slat to take the shape of such slat.

16. A machine according to claim 14 in which said hold-down units include hold-down pads for engaging the front slat and include guide rollers which are arranged to be positioned forwardly adjacent to the upwardly curled rear edge portion of the front slat when the hold-down pads engage the front slat.

17. A machine according to claim 14 in which said punching means comprises wedge-shaped punching elements shaped and arranged to form said locking tabs such that they slope downwardly in the forward direction.

18. A machine according to claim 14 in which said punching means includes punching elements shaped to form said locking tabs with three free edges and to slope downwardly and forwardly.

19. A machine for assembling slats of the type having a front longitudinal side edge portion curled downwardly and rearwardly along the length of the slat, and having a rear longitudinal side edge portion curled upwardly and forwardly along the length of the slat in a complementing configuration whereby the rear curled side edge portion of a front such slat can slidably receive therealong said front side edge portion of an adjoining back such slat in interfitting relation permitting sideways angular movement of the slats in relation to one another, said machine comprising:

slat support means for supporting front and back such slats in interfitting side-by-side relation on front and back locations;

means for moving a slat endwise along a feed path onto said back location from a loading position;

slat-punching means overlying said support means for forming a downwardly sloped locking tab in the front interfitting side edge portion of a back slat while front and back interfitting slats rest on the support means and for also forming a registering underlying cutout in the rear interfitting side edge portion of the front slat such that the locking tab extends into the cutout to prevent relative endwise movement between said slats while permitting relative sideways angular movement therebetween;

normally active slat hold-down means for clamping the front slat against the support means and movable to a raised inactive position;

normally inactive slat-shifting means for selectively forwardly advancing into a slat-shifting position from a rear retracted position behind the slat support means;

first operating means connected to said hold-down means and slat-shifting means for inactivating the hold-down means when the slat-shifting means is operating to move a back slat from said back location to said front location, said first operating means including a first normally open control switch located adjacent said feed path; and switch-closing means carried by the slat feeding means and arranged to close said first control switch when said feeding means is returning to said loading position and hold the first control switch closed a sufficient time period for inactivating the hold-down means and operating the slat-shifting means.

20. A machine according to claim 19 in which second operating means is connected to said slat-punching means for operating the punching means when a slat is delivered to said back location on the slat support means, said second operating means including a second normally open control switch arranged to be closed by said slat feeding means when it has delivered a slat to said back location.

21. A machine according to claim 19 in which said slat-punching means comprises two punching units each having a housing, the spacing between said punching units being adjustable for various slat lengths, said slat hold-down means comprising two hold-down units carried by said housings of the punching units.

22. A machine according to claim 21 in which slat-supporting arms project forwardly from said housings of the punching units for supporting slats shifted forwardly from sad front location.

23. A machine according to claim 19 in which said slat-punching means carries said slat hold-down means and slat-shifting means.

24. A machine according to claim 19 in which slat-supporting arm means projects forwardly from said slat-punching means for supporting slats shifted forwardly from said front location.

25. A machine according to claim 19 in which said slat-punching means comprises two punching units each having a housing mounted on a beam, one of said punching unit housings being adjustable relative to the other along the beam and carrying one of said slat hold-down means and one of said slat-shifting means.

26. A machine according to claim 25 in which two forwardly projecting arms extend from said punching unit housings, and a third forwardly projecting arm is located between said two arms and is slidably adjustable along said beam, said three arms being arranged to support interfitting slats shifted forwardly from said front location.

27. An awning assembly machine comprising:

a beam;

slat-punching means having a housing slidable mounted on said beam;

an anvil section resting on said beam at the location of said housing for supporting two interfitting awning slats;

slat hold-down means mounted on said housing for holding a slat against the anvil section;

a slat-supporting arm projecting from said housing; and slat shifting means carried by said housing for moving slats from the anvil section to said slat-supporting arm.

28. A machine according to claim 27 in which slat feeding means is movably mounted on said beam for feeding a slat to the anvil section.

29. A machine according to claim 28 in which said hold-down means is normally active and said slat-shifting means is normally inactive; and control means for operating said slat-punching means when said hold-down means is active, and for deactivating said hold-down means and activating said slat-shifting means after each operation of said punching means followed by operation of said slat feeding means.

30. A machine according to claim 27 in which said anvil section is carried by said housing of the slat-punching means.

* * * * *

UNITED STATES PATENT AND TRADEMARK OFFICE
CERTIFICATE OF CORRECTION

PATENT NO. : 4,825,519

DATED : May 2, 1989

INVENTOR(S) : Robert M. Henderson; William Aspinall

It is certified that error appears in the above-identified patent and that said Letters Patent is hereby corrected as shown below:

In claim 1, column 8, line 60, delete "he" and substitute therefor --the--.

In claim 7, column 9, line 55, delete "seats," and substitute therefor --seats--.

In claim 9, column 10, lines 9 and 10, delete "received" and substitute therefor --receive--.

In claim 14, column 11, line 18, delete "edged" and substitute therefor --edge--.

In claim 14, column 11, line 27, delete "respectively" and substitute therefor --respective--.

In claim 14, column 11, line 28, delete "longitudinal" and substitute therefor --longitudinally--.

In claim 14, column 11, line 39, delete "form" and substitute therefor --from--.

In claim 22, column 12, line 58, delete "sad" and substitute therefor --said--.

In claim 27, column 13, line 14, delete "slidable" and substitute therefor --slidably--.

Signed and Sealed this

Sixth Day of February, 1990

*Attest:*

JEFFREY M. SAMUELS

*Attesting Officer*

*Acting Commissioner of Patents and Trademarks*